United States Patent
Hori (10) Patent No.: US 8,188,618 B2
(45) Date of Patent: May 29, 2012

(54) POWER SUPPLY CIRCUIT

(75) Inventor: Yuji Hori, Hashima (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 359 days.

(21) Appl. No.: 12/702,703

(22) Filed: Feb. 9, 2010

(65) Prior Publication Data

US 2010/0201200 A1    Aug. 12, 2010

(30) Foreign Application Priority Data

Feb. 12, 2009    (JP) ................................. 2009-030456

(51) Int. Cl.
*H02J 1/00*    (2006.01)
(52) U.S. Cl. ........................................ 307/80
(58) Field of Classification Search ................... 307/80
See application file for complete search history.

(56) References Cited

U.S. PATENT DOCUMENTS

2008/0079315 A1    4/2008    Motomori et al.

FOREIGN PATENT DOCUMENTS

JP    2008-086173 A    4/2008

*Primary Examiner* — Robert L. Deberadinis
(74) *Attorney, Agent, or Firm* — Baker Botts L.L.P.

(57) ABSTRACT

A power supply circuit includes a first DC-DC converter, a second DC-DC converter, a voltage detection circuit, a delay circuit and a switch. The second DC-DC converter converts an output voltage of the first DC-DC converter into a second voltage and outputs the second voltage. The voltage detection circuit outputs a detection signal when an output voltage of the first DC-DC converter becomes a threshold voltage or more. The delay circuit outputs a delayed detection signal with a delay of a predetermined time from a point of time that the detection signal outputted from the voltage detection circuit is inputted to the delay circuit. The switch is connected between the first DC-DC converter and an output terminal. The second DC-DC converter starts an operation in response to the delayed detection signal outputted from the delay circuit. The switch is closed in response to an output from the second DC-DC converter.

13 Claims, 9 Drawing Sheets

| ADAPTER KIND | BATTERY KIND | DELAY TIME |
|---|---|---|
| 01 | — | ta1 |
| 10 | — | ta2 |
| — | 01 | ta3 |
| — | 10 | ta4 |

POWER SUPPLY CIRCUIT

CROSS-REFERENCE TO RELATED APPLICATIONS

This application is based on and claims the benefit of priority from Japanese Patent Application No. 2009-030456 filed on Feb. 12, 2009, the entire contents of which are incorporated herein by reference.

BACKGROUND

1. Field

The present invention relates to a power supply circuit.

2. Description of the Related Art

Along with a demand for low power consumption recent years, with respect to electronic apparatuses, a semiconductor integrated circuit which includes a CPU, a RAM and the like which are operated at a low voltage (for example, 2V or less) has been developed and used. On the other hand, it is often the case that an operational voltage cannot be lowered in peripheral circuits such as various interfaces or input/output circuits (I/O). Accordingly, in such a case, a multi-output power supply circuit which can output a plurality of different voltages becomes necessary.

Figure 9:
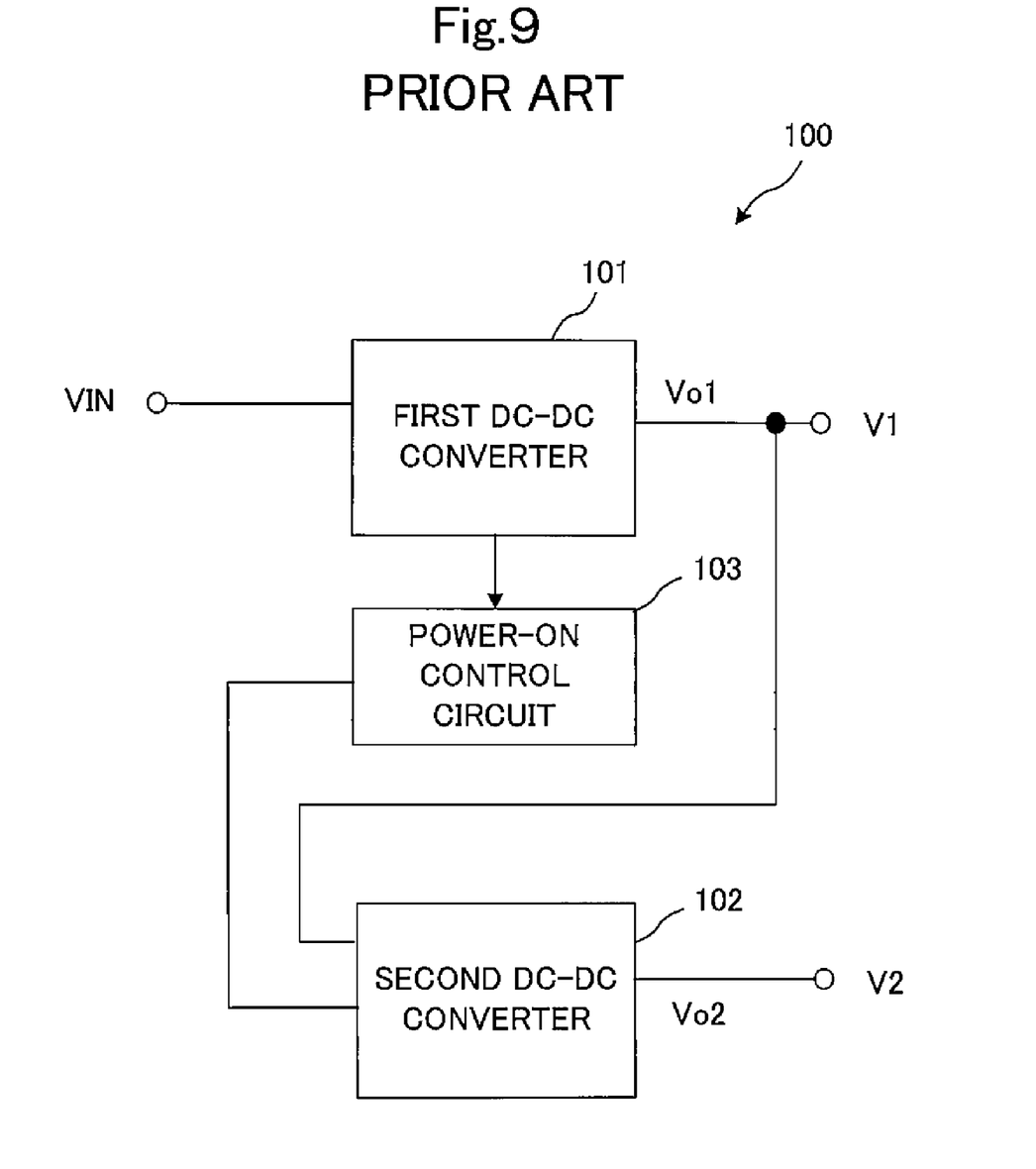
FIG. 9 is a block diagram showing the constitution of a power supply circuit of the related art.

As shown in FIG. 9, a conventional multi-output power supply circuit 100 includes a first DC-DC converter 101 and a second DC-DC converter 102.

A power-supply voltage VIN is inputted to the first DC-DC converter 101 from a battery or an AC adapter. The first DC-DC converter 101 converts the power-supply voltage VIN into a predetermined first voltage V1, and outputs the first voltage V1 therefrom. Further, the second DC-DC converter 102 generates a second voltage V2 by boosting or lowering an output voltage Vo1 of the first DC-DC converter 101, and outputs the second voltage V2 therefrom.

The second DC-DC converter 102 is configured to receive the output voltage Vo1 as an input. Accordingly, it is necessary to operate the second DC-DC converter 102 after the output voltage Vo1 of the first DC-DC converter 101 sufficiently rises.

Accordingly, the above-mentioned conventional multi-output power supply circuit 100 includes a power-on control circuit 103. The power-on control circuit 103 detects that the output voltage Vo1 of the first DC-DC converter 101 becomes a threshold voltage Vth or more, and operates the second DC-DC converter 102 at this detection timing. The threshold voltage Vth is, for example, a voltage which is 90% of the first voltage V1.

SUMMARY

In the above-mentioned conventional multi-output power supply circuit 100, the second DC-DC converter 102 is operated when the output voltage Vo1 of the first DC-DC converter 101 assumes the voltage (threshold voltage Vth) sufficient for operating the second DC-DC converter 102 and hence, the multi-output power supply circuit 100 has a following drawback.

That is, there may be a case where a circuit to which the output voltage Vo1 of the first DC-DC converter 101 is supplied (hereinafter referred to as "first circuit") and a circuit to which an output voltage Vo1 of the second DC-DC converter 102 is supplied (hereinafter referred to as "second circuit") are constituted of a semiconductor circuit respectively, and the first circuit and the second circuit are electrically connected with each other. In such a case, a penetration current flows into the second circuit from the first circuit due to a lag between a rise time of the output voltage Vo1 and a rise time of the output voltage Vo1 thus giving rise to a drawback such as a latch-up. To overcome this drawback, it is thought that a switch which is closed in response to an output voltage of the second DC-DC converter 102 is provided between an output terminal of the first DC-DC converter 101 and an input terminal of the first circuit. However, when a power supply voltage supplied to the first DC-DC converter 101 is low, a time which elapses from a point of time that the output voltage Vo1 of the first DC-DC converter 101 becomes the threshold voltage Vth to a point of time that the output voltage Vo1 reaches the first voltage V1 is prolonged. Accordingly, a drawback such as a latch-up still remains as described below.

When the output voltage Vo1 of the first DC-DC converter 101 becomes the threshold voltage Vth, the second DC-DC converter 102 is operated, and the above-mentioned switch is operated so that the supply of power to both the first circuit and the second circuit starts. Here, power is supplied to the first circuit and the second circuit simultaneously and hence, a sudden load change occurs on an output side of the first DC-DC converter 101. On the other hand, when a voltage of power supplied to the first DC-DC converter 101 is low, it takes time before the output voltage Vo1 of the first DC-DC converter 101 reaches the first voltage V1 and hence, a sudden load change occurs on the output side whereby when the output voltage Vo1 of the first DC-DC converter 101 is temporarily dropped, there may be a case where the output voltage becomes lower than the threshold voltage Vth. Accordingly, an operation of the second DC-DC converter 102 is temporarily stopped by a power-on control circuit 103 so that a penetration current flows into the second circuit from the first circuit.

The present invention has been made to overcome the above-mentioned drawbacks, and it is an object of the present invention to provide a power supply circuit which exhibits a stable operation even when a voltage of inputted power is low in a multi-output power supply circuit.

To achieve the above-mentioned object, according to one aspect of the present invention, there is provided a power supply circuit which includes: a first DC-DC converter; a voltage detection circuit; a delay circuit; a switch; and a second DC-DC converter. Here, the first DC-DC converter is configured to convert a voltage supplied from a power supply to a first voltage and is configured to output the first voltage therefrom. The voltage detection circuit is configured to output a detection signal when an output voltage of the first DC-DC converter becomes a threshold voltage or more. The delay circuit is configured to output a delayed detection signal with a delay of a predetermined time from a point of time that the detection signal outputted from the voltage detection circuit is inputted to the delay circuit. The switch is connected between the first DC-DC converter and an output terminal and is configured to output the output voltage of the first DC-DC converter to the output terminal when the switch is closed. The second DC-DC converter is configured to convert the output voltage of the first DC-DC converter into a second voltage and to output the second voltage therefrom. Further, in such a power supply circuit, the second DC-DC converter is configured to start an operation thereof in response to the delayed detection signal outputted from the delay circuit. The switch is closed in response to an output from the second DC-DC converter.

To achieve the above-mentioned object, according to another aspect of the present invention, there is provided a power supply circuit which includes: a first DC-DC converter; a voltage detection circuit; a delay circuit; a switch;

and a second DC-DC converter. Here, the first DC-DC converter is configured to convert a voltage supplied from a power supply to a first voltage and is configured to output the first voltage therefrom. The voltage detection circuit is configured to output a detection signal when an output voltage of the first DC-DC converter becomes a threshold voltage or more. The delay circuit is configured to output a delayed detection signal with a delay of a predetermined time from a point of time that the detection signal outputted from the voltage detection circuit is inputted to the delay circuit. The switch is connected between the first DC-DC converter and an output terminal and is configured to output the output voltage of the first DC-DC converter to the output terminal when the switch is closed. The second DC-DC converter is configured to convert the voltage supplied from the power supply into a second voltage and to output the second voltage therefrom. Further, in such a power supply circuit, the second DC-DC converter is configured to start an operation thereof in response to the delayed detection signal outputted from the delay circuit. The switch is closed in response to an output from the second DC-DC converter.

DETAILED DESCRIPTION

Hereinafter, several embodiments of the present invention are explained specifically in conjunction with attached drawings.

First Embodiment

Figure 1:
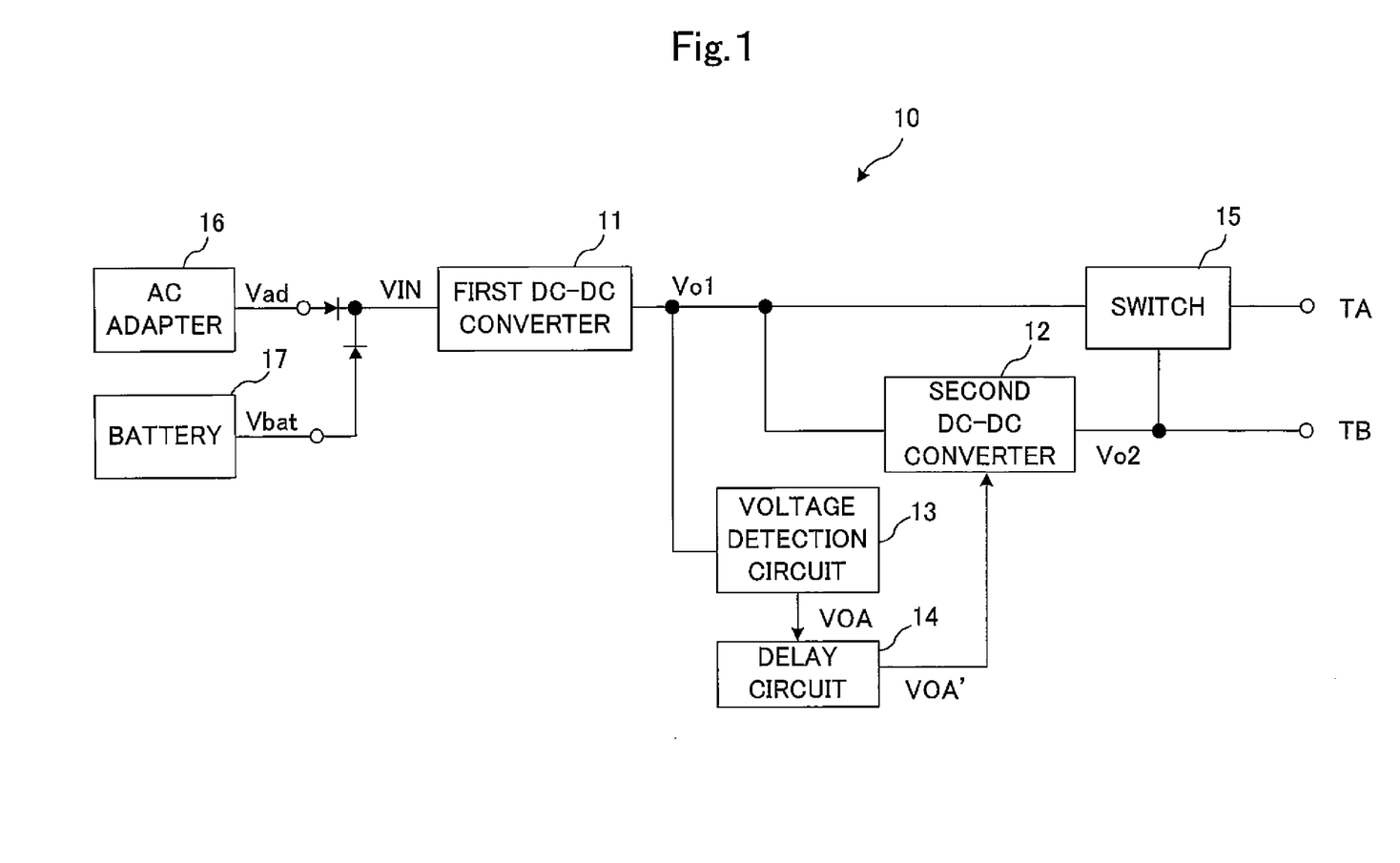
FIG. 1 is a block diagram showing the constitution of a power supply circuit according to a first embodiment.

Firstly, a power supply circuit according to the first embodiment is explained. As shown in FIG. 1, a power supply circuit 10 according to the first embodiment includes a first DC-DC converter 11, a second DC-DC converter 12, a voltage detection circuit 13, a delay circuit 14, and a switch 15.

The power supply circuit 10 is connectable with an AC adapter 16 and a battery 17. The first DC-DC converter 11 converts a voltage outputted from the AC adapter 16 or the battery 17 into a first voltage V1. In the explanation made hereinafter, it is assumed that the relationship of AC adapter voltage Vad (for example, 6V or more)>first voltage V1 (for example, 5V)>battery voltage Vbat (for example, 3V) is established. Further, in the explanation made hereinafter, when the first DC-DC converter 11 receives the supply of power from the AC adapter 16, the first DC-DC converter 11 performs a function of lowering an input voltage, while when the first DC-DC converter 11 receives the supply of power from the battery 17, the first DC-DC converter 11 performs a function of boosting the input voltage. However, the boosting operation or the lowering operation of the voltage of the first DC-DC converter 11 is not limited to the above-mentioned manner of operation. Diodes for preventing a reverse flow are provided to the power supply circuit 10 as shown in FIG. 1. Accordingly, when the AC adapter 16 and the battery 17 are connected to the first DC-DC converter 11, power is supplied to the first DC-DC converter 11 from the AC adapter 16.

The second DC-DC converter 12 converts an output voltage Vo1 of the first DC-DC converter 11 into a second voltage V2, and outputs the second voltage V2 therefrom. The second DC-DC converter 12 starts an operation thereof when a control voltage VOA' of H level which is a delayed detection signal transmitted from the delay circuit 14 is inputted therein. Here, it is assumed that the relationship of first voltage V1 (for example, 5V)>second voltage V2 (for example, 1.2V) is established. However, the relationship between the first voltage V1 and the second voltage V2 is not limited to such relationship.

The voltage detection circuit 13 outputs a detection voltage VOA of H level as a detection signal when the output voltage Vo1 of the first DC-DC converter 11 becomes a set threshold voltage Vth1 or more. The voltage detection circuit 13 is constituted of a comparator, for example. The output voltage Vo1 of the first DC-DC converter 11 is inputted to a positive input (+) terminal of the comparator, and the threshold value Vth1 is inputted to a negative input (−) terminal of the comparator. The detection signal which the voltage detection circuit 13 outputs is not limited to a pulse-shaped signal and, for example, may be a step-shaped signal.

The delay circuit 14 outputs a delayed detection signal with a delay of a predetermined time ta from a point of time that the detection voltage VOA of H level is inputted, which is outputted from the voltage detection circuit 13 as a detection signal. The delay circuit 14 is, for example, constituted of a low pass filter, a comparator and the like. A rising waveform of the detection signal is rounded by the low pass filter, and the detection signal is subject to waveform shaping by the comparator and hence, the detection signal can be delayed by the predetermined time ta.

The switch 15 is provided between an output terminal of the first DC-DC converter 11 and an output terminal TA. When the switch 15 is closed, the output voltage Vo1 of the first DC-DC converter 11 is outputted to the output terminal TA. When the output voltage Vo1 of the second DC-DC converter 12 becomes the threshold voltage Vth2 or more, the switch 15 is closed, while when the output voltage Vo2 of the second DC-DC converter 12 is less than the threshold voltage Vth2, the switch 15 is opened. Accordingly, the switch 15 is held in an open state until the output voltage Vo2 of the second DC-DC converter 12 becomes the threshold voltage Vth2 so that the output voltage Vo1 is not outputted to the output terminal TA. On the other hand, when the output voltage Vo2 becomes the threshold voltage Vth2 or more, the switch 15 is closed so that the output voltage Vo1 is outputted to the output terminal TA. The switch 15 may be constituted of a field effect transistor (FET), for example.

Figure 2A:
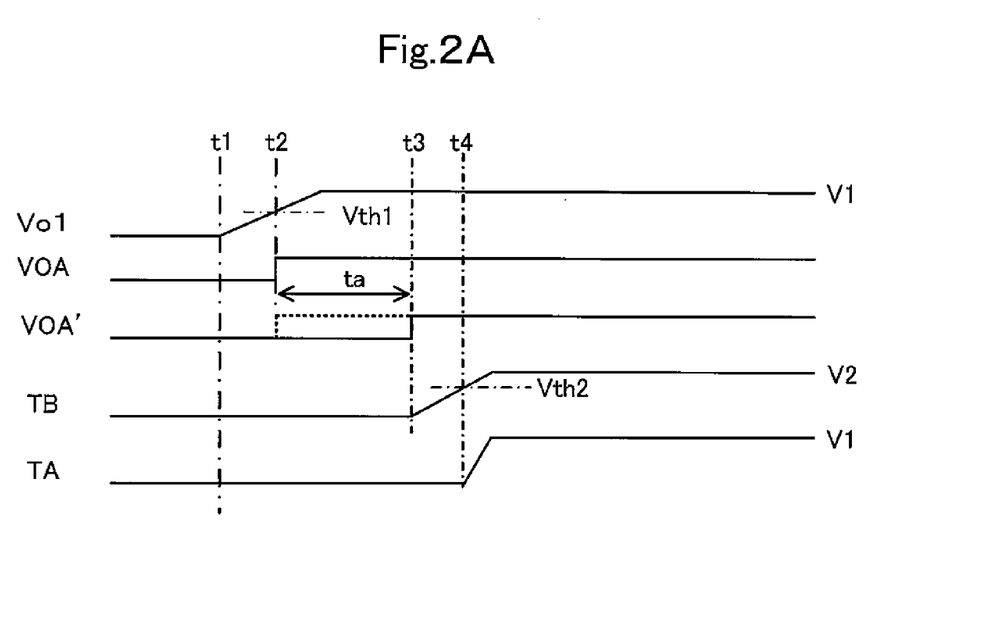
FIG. 2A is a timing chart for explaining the manner of operation of the power supply circuit according to the first embodiment.
Figure 2B:
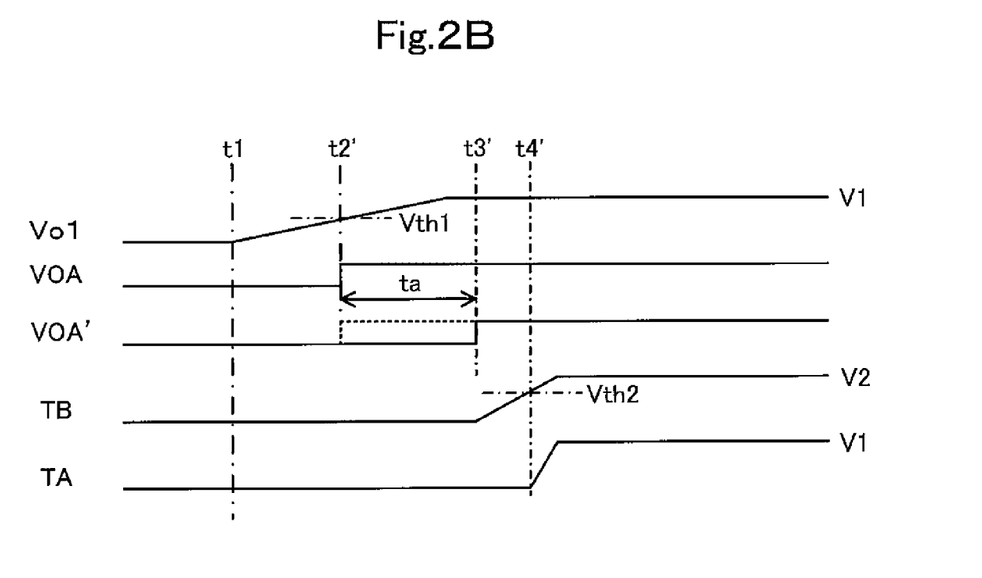
FIG. 2B is a timing chart for explaining the manner of operation of the power supply circuit according to the first embodiment.

The manner of operation of the power supply circuit 10 having the above-mentioned constitution is explained in conjunction with a timing chart shown in FIG. 2A and FIG. 2B. To be more specific, the manner of operation of the power supply circuit 10 when the power supply circuit 10 is connected to the AC adapter 16 is explained in conjunction with FIG. 2A. The manner of operation of the power supply circuit 10 when the power supply circuit 10 is connected to the battery 17 is explained in conjunction with FIG. 2B.

As shown in FIG. 2A and FIG. 2B, when the supply of power from the power supply (the AC adapter 16 or the battery 17) starts (timing t1), the first DC-DC converter 11 starts a voltage conversion operation thus boosting the output voltage Vo1 to the first voltage V1.

The voltage detection circuit 13, when the output voltage Vo1 of the first DC-DC converter 11 becomes the threshold voltage Vth1 or more, outputs the detection voltage VOA of H level as a detection signal (timing t2, t2').

The delay circuit 14 is configured to output the control voltage VOA' corresponding to a change of the detection voltage VOA of the voltage detection circuit 13 with a delay of a predetermined time ta. That is, the delay circuit 14 outputs the delayed detection signal which is the control voltage VOA' of H level with a delay of the predetermined time ta from the point of time that the detection signal which is the detection voltage VOA of H level is inputted (timing t3, t3').

The delayed detection signal is inputted to the second DC-DC converter 12 so as to start an operation of the second DC-DC converter 12.

Accordingly, the second DC-DC converter 12 starts a voltage conversion operation after a lapse of the predetermined time ta from the point of time that the output voltage Vo1 of the first DC-DC converter 11 becomes the threshold voltage Vth1 or more.

Here, irrespective of the power supply being the AC adapter 16 or the battery 17, the predetermined time ta is set to last between a point of time that the output voltage Vo1 of the first DC-DC converter 11 becomes the first voltage V1 and a point of time that the second DC-DC converter 12 starts an operation thereof. By setting the predetermined time ta in this manner, even when the threshold voltage Vth1 is lowered, it is possible to start an operation of the second DC-DC converter 12 after the output voltage Vo1 of the first DC-DC converter 11 becomes the first voltage V1. Accordingly, it is possible to ensure a stable operation of the power supply circuit 10.

When the second DC-DC converter 12 starts and the output voltage Vo2 of the second DC-DC converter 12 becomes a threshold voltage Vth2 or more, the switch 15 is closed. Accordingly, the output voltage Vo1 of the first DC-DC converter 11 is outputted to the output terminal TA (timing t4, t4').

The responsiveness of the switch 15 can be enhanced by forming the switch 15 using a field effect transistor (FET), for example. In this case, it is possible to start the supply of voltages to the output terminals TA, TB while suppressing the potential difference therebetween. Accordingly, it is possible to suppress the occurrence of a drawback that a penetration current flows into a second circuit which is connected to the output terminal TB from the first circuit which is connected to the output terminal TA.

Particularly, the switch 15 is closed after the output voltage Vo1 of the first DC-DC converter 11 becomes the first voltage V1. Accordingly, it is possible to start the supply of voltages to the output terminals TA, TB while suppressing the potential difference as much as Vs (=V1−V2) and hence, the above-mentioned drawback on the penetration current or the like can be suppressed more effectively.

In this manner, according to the power supply circuit 10 of the first embodiment, even when the voltage of the inputted power supply is low, the power supply circuit 10 can ensure the stable operation thereof thus enhancing reliability of an electronic apparatus into which the power supply circuit 10 is incorporated. Further, even when the power supply circuit 10 is connected to a plurality of power supplies of different voltages, the power supply circuit 10 can ensure a stable operation thereof in the same manner.

Second Embodiment

Next, a power supply circuit according to the second embodiment is explained.

In the power supply circuit 10 of the first embodiment described above, outputting of the detection signal is delayed by the predetermined time ta which is preliminarily set. On the other hand, in the power supply circuit of the second embodiment, the predetermined time ta is set variable by providing a power supply detection part which detects a kind of a power supply.

Figure 3:
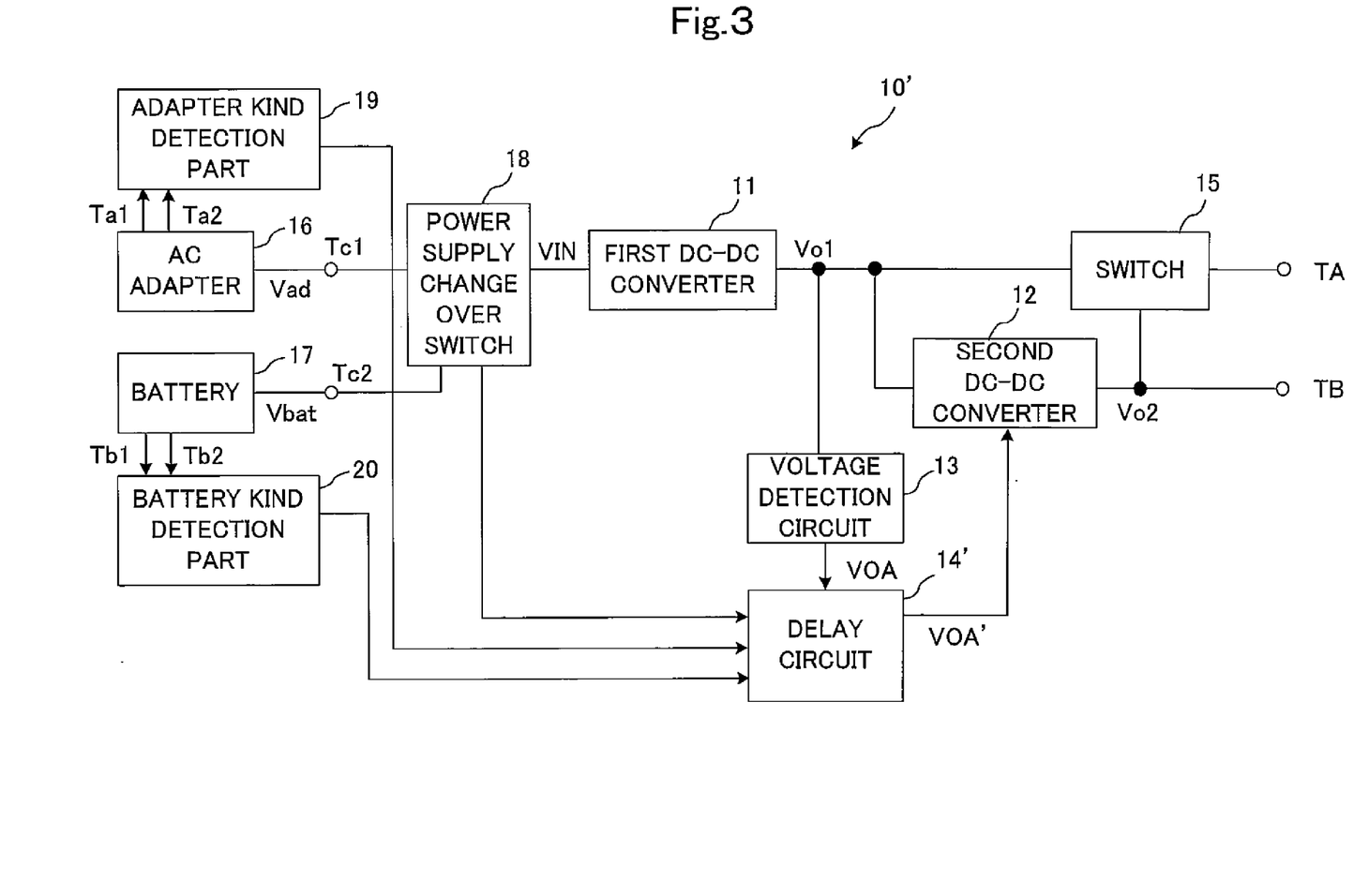
FIG. 3 is a block diagram showing the constitution of a power supply circuit according to a second embodiment.

That is, as shown in FIG. 3, a power supply circuit 10' of the second embodiment includes a power supply detection part which is constituted of a power supply changeover switch 18, an adapter kind detection part 19, and a battery kind detection part 20. The power supply circuit 10' changes a delay time (predetermined time ta) of a delay circuit 14' based on an output from the power supply detection part. The constitution of the power supply circuit 10' is substantially equal to the constitution of the power supply circuit 10 of the first embodiment with respect to other constitutional parts and hence, the explanation of other constitutional parts is omitted here.

One example of the detection of a kind of power supply by the power supply detection part is explained hereinafter.

The adapter kind detection part 19 is connected to two determination-use terminals Ta1, Ta2 mounted on an AC adapter 16, and determines whether two determination-use terminals Ta1, Ta2 are connected to a ground voltage (GND), or are in an open state where these determination-use terminals Ta1, Ta2 are not connected to any voltages. Then, the adapter kind detection part 19 outputs AC adapter kind detection information (Ta1, Ta2) to the delay circuit 14'. For example, when the determination-use terminal Ta1 is connected to the ground voltage and the determination-use terminal Ta2 is in an open state, the adapter kind detection part 19 outputs AC adapter kind detection information (10) to the delay circuit 14'.

In the same manner, the battery kind detection part 20 is connected to two determination-use terminals Tb1, Tb2 mounted on the battery 17, and determines whether two determination-use terminals Tb1, Tb2 are connected to the ground voltage (GND), or are in an open state where these determination-use terminals Tb1, Tb2 are not connected to any voltages. Then, the battery kind detection part 20 outputs battery kind detection information (Tb1, Tb2) to the delay circuit 14'. For example, when the determination-use terminal Tb1 is in an open state and determination-use terminal Tb2 is connected to the ground voltage, the battery kind detection part 20 outputs battery kind detection information (01) to the delay circuit 14'.

Further, the power supply changeover switch 18 selects either one of the supply of power by the AC adapter 16 and the supply of power by the battery 17, and connects the selected power supply (the AC adapter 16 or the battery 17) to the first DC-DC converter 11. The power supply changeover switch 18 notifies the delay circuit 14' of information on the kind of selected power supply. The power supply changeover switch 18 selects the supply of power by the AC adapter 16 when only the AC adapter 16 is connected to the first DC-DC converter 11. On the other hand, the power supply changeover switch 18 selects the supply of power by the battery 17 when only the battery 17 is connected to the first DC-DC converter 11. Further, both the supply of power by the AC adapter 16 and the supply of power by the battery 17 are possible, the supply of power by the AC adapter 16 is selected. In this embodiment, the power supply changeover switch 18 is configured to detect the connection of the AC adapter 16 or the battery 17 by detecting voltages of input terminals Te1, Te2. However, the connection of the AC adapter 16 or the battery 17 may be detected based on information from the adapter kind detection part 19 and the battery kind detection part 20.

Figure 4:
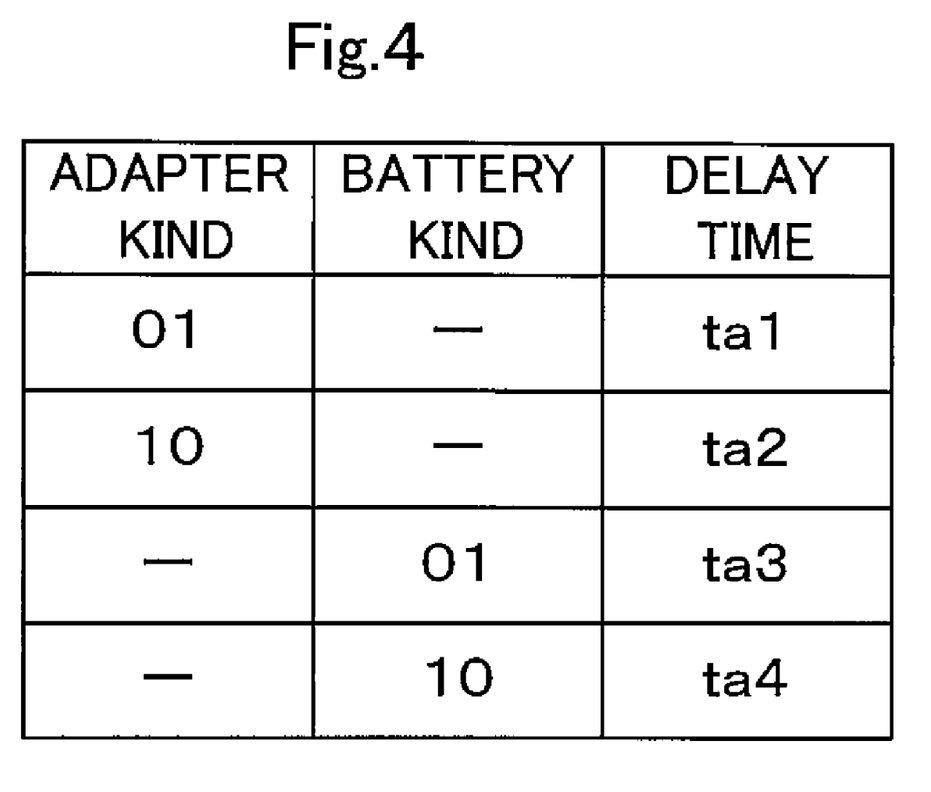
FIG. 4 is a table for explaining the manner of operation of the power supply circuit according to the second embodiment.

The delay circuit 14' includes a delay time table shown in FIG. 4. The delay circuit 14' looks up this delay time table and changes the predetermined time to which is a delay time based on information on the kind of AC adapter, the kind of battery and the kind of power supply. In an example shown in FIG. 4, as the kind of AC adapter, two kinds of AC adapters which are distinguished from each other by AC adapter kind detection information (01), (10) are provided. Further, in the same manner as the kind of AC adapter, as the kind of battery, two kinds of batteries which are distinguished from each other by battery kind detection information (01), (10) are provided, and as the predetermined time ta of the delay circuit 14', any one of times ta1 to ta4 corresponding to the respective kinds is set as the predetermined time ta of the delay circuit 14'.

For example, assume a case where both the AC adapter 16 and the battery 17 are connected to the power supply circuit 10', AC adapter kind detection information (01) is outputted from the adapter kind detection part 19, and the battery kind detection information (01) is outputted from the battery kind detection part 20. Here, when the information on the kind of power supply is information which indicates that the power supply is the AC adapter 16, the delay circuit 14' selects and sets the time ta1 as the predetermined time ta based on the delay time table. On the other hand, when the information on the kind of power supply notified from the power supply changeover switch 18 is information which indicates that the power supply is the battery 17, the delay circuit 14' selects and sets the time ta3 as the predetermined time ta based on the delay time table.

The respective times ta1 to ta4 are set to times which are necessary and sufficient for the output voltage Vo1 of the first DC-DC converter 11 to reach the first voltage V1 for respective power supplies (the AC adapter 16 and the battery 17) which supply power. By setting the respective times ta1 to ta4 in this manner, it is possible to rapidly start the supply of first and second voltages V1, V2 to the output terminals TA, TB from the power supply circuit 10' while suppressing the generation of a penetration current or the like.

Figure 5:
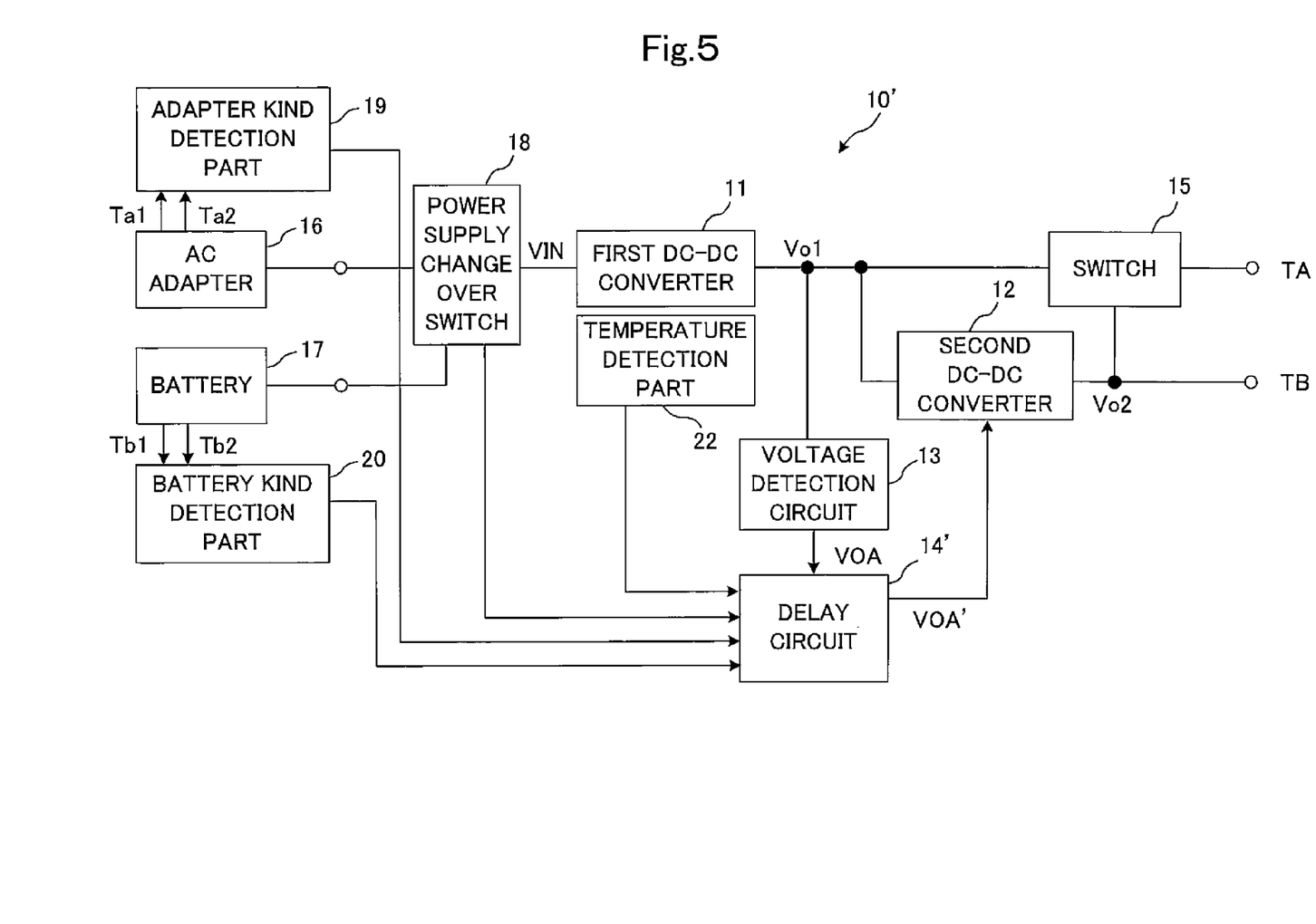
FIG. 5 is a block diagram showing the constitution of a power supply circuit according to a modification of the second embodiment.

Here, as shown in FIG. 5, the power supply circuit according to the embodiment 2 may include a temperature, detection part 22 which detects a temperature of the first DC-DC converter 11, and may correct the times ta1 to ta4 corresponding to the temperatures of the first DC-DC converter 11. With the use of the temperature detection part 22, it is possible to provide a power supply circuit which can be operated with high reliability even when the output characteristic of the first DC-DC converter 11 may change due to the temperature. For example, when the output characteristic of the first DC-DC converter 11 changes by 5% between a temperature range from 20 to 30° C. and a temperature range from 30 to 40° C., the times ta1 to ta4 are corrected by 5%.

Further, in the above-mentioned delay circuit 14', the kind of power supply which supplies power is determined based on information on the kind of power supply notified from the power supply changeover switch 18. However, the determination of the kind of power supply which supplies power is not limited to such determination. For example, when information outputted from the adapter kind detection part 19 is (00), the AC adapter 16 is not connected to the power supply circuit 10', and when information outputted from the battery kind detection part 20 is (00), the battery 17 is not connected to the power supply circuit 10'. Accordingly, the kind of power may be determined based on such information.

Further, the above-mentioned delay circuit 14' uses plural kinds of AC adapters 16 and plural kinds of batteries 17. However, as kinds of power supplies which supply power, it is possible to use only two power supplies consisting of one AC adapter 16 and one battery 17. In this case, the adapter kind detection part 19 and the battery kind detection part 20 become unnecessary.

In this manner, the power supply circuit 10' according to the second embodiment includes the power supply kind detection part, and allows the delay circuit 14' to delay outputting of a detection signal by a delay time corresponding to a detection result from the power supply kind detection part. Accordingly, it is possible to rapidly start the supply of first and second voltages V1, V2 to the output terminals TA, TB from the power supply circuit 10' while suppressing the generation of a penetration current or the like. Further, by providing the temperature detection part 22 to the power supply circuit, the reliability of the power supply circuit can be further enhanced.

Third Embodiment

Next, a power supply circuit according to the third embodiment is explained.

In the power supply circuit 10 of the first embodiment described above, outputting of the detection signal is delayed by the predetermined time to which is preliminarily set. On the other hand, in the power supply circuit of the third embodiment, the predetermined time ta is set variable corresponding to a gradient of an output voltage (output characteristic) of a first DC-DC converter.

Figure 6:
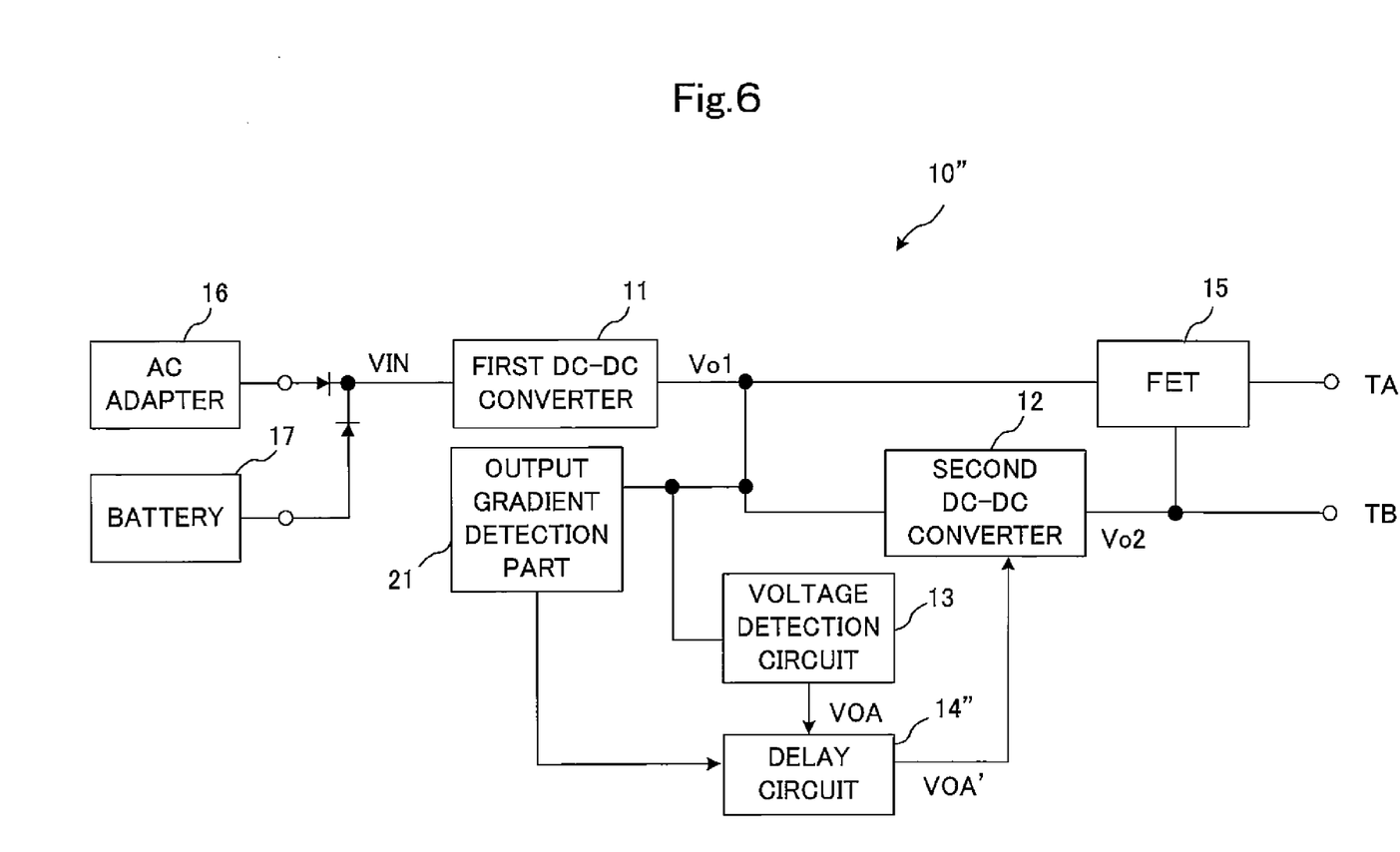
FIG. 6 is a block diagram showing the constitution of a power supply circuit according to a third embodiment.

That is, as shown in FIG. 6, a power supply circuit 10" of the third embodiment includes an output gradient detection part 21 which detects a gradient $\Delta$Vo1 of an output voltage Vo1 when the first DC-DC converter 11 starts an operation thereof. The power supply circuit 10" changes a delay time (predetermined time ta) of a delay circuit 14" based on an output from the output gradient detection part 21. The constitution of the power supply circuit 10" is substantially equal to the constitution of the power supply circuit 10 of the first embodiment with respect to other constitutional parts and hence, the explanation of other constitutional parts is omitted here.

In the output gradient detection part 21, in addition to a threshold voltage Vth1, a threshold voltage Vth0 which is a voltage lower than the threshold voltage Vth1 is set. The output gradient detection part 21 detects a time tb from a point of time that an output voltage of the first DC-DC converter 11 becomes the threshold voltage Vth0 to a point of time that the output voltage of the first DC-DC converter 11 reaches the threshold voltage Vth1, and detects a gradient $\Delta$Vo1 of the output voltage Vo1. Information on the gradient $\Delta$Vo1 of the output voltage Vo1 detected by the output gradient detection part 21 in this manner is notified to a delay circuit 14" from the output gradient detection part 21.

Figure 7A:
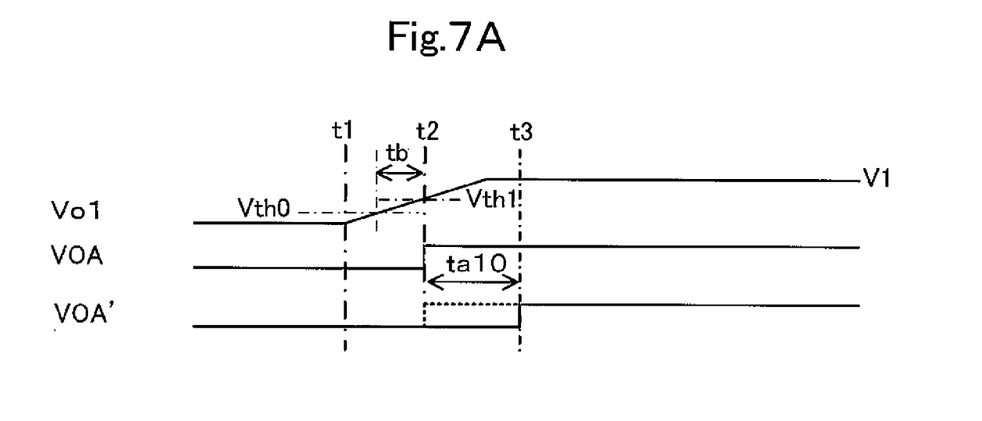
FIG. 7A is a timing chart for explaining the manner of operation of the power supply circuit according to the third embodiment.
Figure 7B:
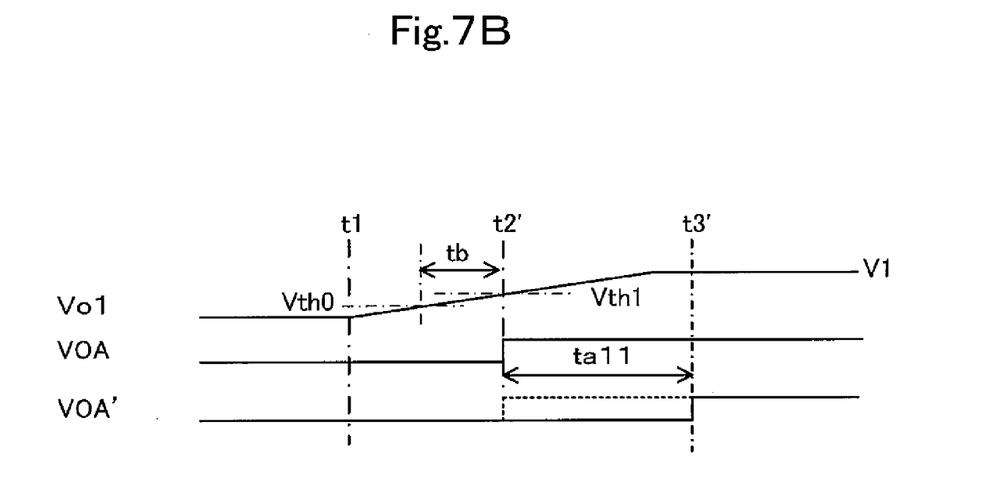
FIG. 7B is a timing chart for explaining the manner of operation of the power supply circuit according to the third embodiment.

For example, as shown in FIG. 7A, when the gradient ΔVo1 of the output voltage Vo1 is steep, the delay time is set to a short time ta10 so that a detection signal is outputted with a delay of time ta10 from the delay circuit 14". On the other hand, as shown in FIG. 7B, when the gradient ΔVo1 of the output voltage Vo1 is gentle, the delay time is set to a long time ta11 (>ta10) so that the detection signal is outputted with a delay of time ta11 from the delay circuit 14".

The time ta10, ta11 or the like which corresponds to the gradient ΔVo1 of the output voltage Vo1 is set to a time necessary and sufficient for the output voltage Vo1 of the first DC-DC converter 11 to reach a first voltage Vo1. Accordingly, it is possible to rapidly start the supply of first and second voltages V1, V2 to the output terminals TA, TB from the power supply circuit 10" while suppressing the generation of a penetration current or the like.

In this manner, the power supply circuit 10" according to the third embodiment includes the output gradient detection part 21, and allows the delay circuit 14" to delay outputting of a detection signal by a delay time corresponding to a detection result from the output gradient detection part 21. Accordingly, it is possible to rapidly start the supply of first and second voltages V1, V2 to the output terminals TA, TB from the power supply circuit 10" while suppressing the generation of a penetration current or the like.

Another Embodiment

Figure 8:
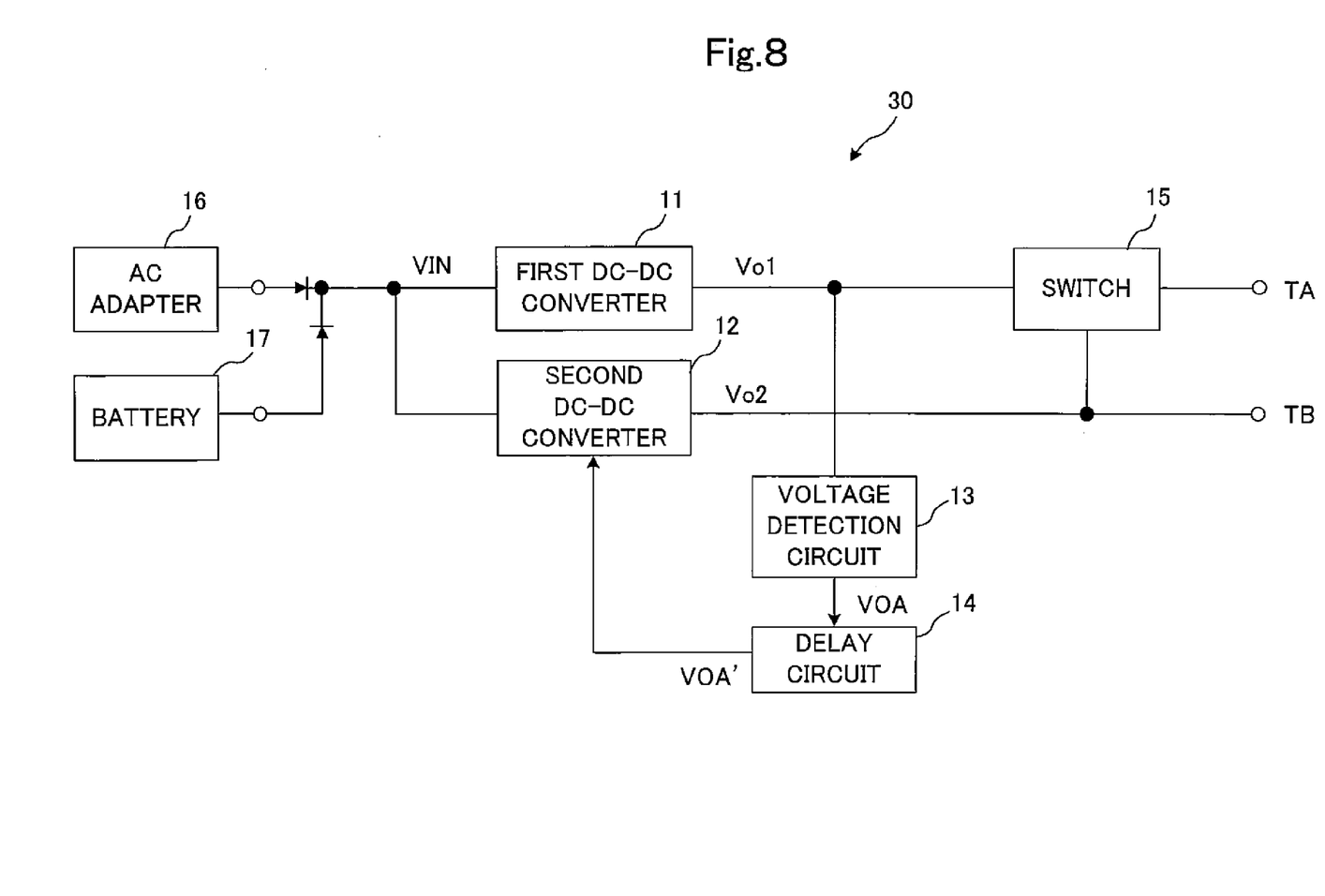
FIG. 8 is a block diagram showing the constitution of a power supply circuit according to another embodiment.

In the power supply circuits 10, 10', 10" according to the first to third embodiments described above, the output voltage Vo1 of the first DC-DC converter 11 is inputted to the second DC-DC converter 12. However, as in the case of a power supply circuit 30 shown in FIG. 8, power may be supplied to the second DC-DC converter 12 from the power supply (the AC adapter 16 or the battery 17) in the same manner as the first DC-DC converter 11. This embodiment also can acquire advantageous effects substantially equal to the advantageous effects acquired by the first to third embodiments.

The respective embodiments described above merely constitute some examples of the present invention, and the present invention is not limited to such embodiments. Accordingly, it is needless to say that various modifications are conceivable in designing or the like without departing from the technical concept of the present invention.

What is claimed is:

1. A power supply circuit comprising:
   a first DC-DC converter which is configured to convert a voltage supplied from a power supply to a first voltage and is configured to output the first voltage therefrom;
   a voltage detection circuit which is configured to output a detection signal when an output voltage of the first DC-DC converter becomes a threshold voltage or more;
   a delay circuit which is configured to output a delayed detection signal with a delay of a predetermined time from a point of time that the detection signal outputted from the voltage detection circuit is inputted to the delay circuit;
   a switch which is connected between the first DC-DC converter and an output terminal and is configured to output the output voltage of the first DC-DC converter to the output terminal when the switch is closed; and
   a second DC-DC converter which is configured to convert the output voltage of the first DC-DC converter into a second voltage and to output the second voltage therefrom, wherein
   the second DC-DC converter is configured to start an operation thereof in response to the delayed detection signal outputted from the delay circuit, and
   the switch is closed in response to an output from the second DC-DC converter.

2. The power supply circuit according to claim 1, further comprising a power supply detection part which is configured to detect a kind of power supply, wherein the delay circuit is configured to change a delay time of the detection signal corresponding to the kind of power supply detected by the power supply detection part.

3. The power supply circuit according to claim 2, wherein the power supply includes an AC adapter which is configured to output the first voltage, and a battery which is configured to output a second voltage lower than the first voltage, and the power supply detection part detects that a kind of power supply is either one of the battery and the AC adapter.

4. The power supply circuit according to claim 2, wherein the power supply detection part includes a battery kind detection part which is configured to detect a kind of battery, and the delay circuit is configured to change a delay time of the detection signal corresponding to the kind of battery detected by the battery kind detection part.

5. The power supply circuit according to claim 2, wherein the power supply detection part includes an adapter kind detection part which is configured to detect a kind of AC adapter, and the delay circuit is configured to change a delay time of the detection signal corresponding to the kind of AC adapter detected by the adapter kind detection part.

6. The power supply circuit according to claim 1, further comprising a temperature detection part which is configured to detect a temperature of the first DC-DC converter, wherein the delay circuit is configured to change a delay time of the detection signal corresponding to the temperature detected by the temperature detection part.

7. The power supply circuit according to claim 1, wherein the switch is constituted of a field effect transistor.

8. A power supply circuit comprising:
   a first DC-DC converter which is configured to convert a voltage supplied from a power supply to a first voltage and is configured to output the first voltage therefrom;
   a voltage detection circuit which is configured to output a detection signal when an output voltage of the first DC-DC converter becomes a threshold voltage or more;
   a delay circuit which is configured to output a delayed detection signal with a delay of a predetermined time from a point of time that the detection signal outputted from the voltage detection circuit is inputted to the delay circuit;
   a switch which is connected between the first DC-DC converter and an output terminal and is configured to output the output voltage of the first DC-DC converter to the output terminal when the switch is closed; and
   a second DC-DC converter which is configured to convert the voltage supplied from the power supply into a second voltage and to output the second voltage therefrom, wherein
   the second DC-DC converter is configured to start an operation thereof in response to the delayed detection signal outputted from the delay circuit, and
   the switch is closed in response to an output from the second DC-DC converter.

9. The power supply circuit according to claim 8, further comprising a power supply detection part which is configured to detect a kind of power supply, wherein the delay circuit is configured to change a delay time of the detection signal corresponding to the kind of power supply detected by the power supply detection part.

10. The power supply circuit according to claim 9, wherein the power supply includes an AC adapter which is configured to output the first voltage, and a battery which is configured to output a second voltage lower than the first voltage, and the power supply detection part detects that a kind of power supply is either one of the battery and the AC adapter.

11. The power supply circuit according to claim 9, wherein the power supply detection part includes a battery kind detection part which is configured to detect a kind of battery, and the delay circuit is configured to change a delay time of the detection signal corresponding to the kind of battery detected by the battery kind detection part.

12. The power supply circuit according to claim 9, wherein the power supply detection part includes an adapter kind detection part which is configured to detect a kind of AC adapter, and the delay circuit is configured to change a delay time of the detection signal corresponding to the kind of AC adapter detected by the adapter kind detection part.

13. The power supply circuit according to claim 8, further comprising a temperature detection part which is configured to detect a temperature of the first DC-DC converter, wherein the delay circuit is configured to change a delay time of the detection signal corresponding to the temperature detected by the temperature detection part.

\* \* \* \* \*